United States Patent [19]

Watanabe

[11] Patent Number: 5,186,877
[45] Date of Patent: Feb. 16, 1993

[54] PROCESS OF PREPARING ELECTRODE FOR FUEL CELL

[75] Inventor: Masahiro Watanabe, No. 2-10, Kitashin 2-chome, Kofu-shi, Yamanashi, Japan

[73] Assignees: Tanaka Kikinzoku Kogyo K.K.; Masahiro Watanabe, both of Japan

[21] Appl. No.: 782,573

[22] Filed: Oct. 25, 1991

[30] Foreign Application Priority Data

Oct. 25, 1990 [JP] Japan .................. 2-287824

[51] Int. Cl.$^5$ ............................................ B29C 43/00
[52] U.S. Cl. ................................. 264/104; 264/105; 264/112; 264/122; 429/42
[58] Field of Search ............... 264/104, 105, 112, 122; 156/62.2; 429/42

[56] References Cited

U.S. PATENT DOCUMENTS

| | | | |
|---|---|---|---|
| 3,134,697 | 5/1964 | Niedrach | 429/40 |
| 3,276,909 | 10/1966 | Moos | 264/105 |
| 3,297,484 | 1/1967 | Niedrach | 429/42 |
| 3,432,355 | 3/1969 | Niedrach et al. | 429/42 |
| 3,634,569 | 1/1972 | Emanuelson et al. | 264/105 |
| 4,115,632 | 9/1978 | Kinoshita et al. | 429/188 |
| 4,317,789 | 3/1982 | Groult et al. | 264/105 |
| 4,359,438 | 11/1982 | Hoggins et al. | 264/105 |
| 4,892,637 | 1/1990 | Sauer et al. | 204/291 |
| 5,053,375 | 10/1991 | Rao | 502/101 |

FOREIGN PATENT DOCUMENTS 55-38934 3/1980 Japan .

*Primary Examiner*—Mary Lynn Theisen
*Attorney, Agent, or Firm*—Klauber & Jackson

[57] ABSTRACT

Disclosed are processes of preparing an electrode for a fuel cell which comprises impregnating catalyst particles with a solution of ion exchange resin to form, after drying, a thin layer of the ion exchange resin on the surface thereof, impregnating non-catalyst particles separately prepared with a solution of ion exchange resin to form, after drying, a thicker layer of the ion exchange resin on the surface thereof than that on the catalyst particle surface, mixing the two kinds of particles coated with the ion exchange resin film with a hydrophobic binder, forming a sheet-like catalyst layer by means of hot pressing or cold pressing and thermally bonding this sheet-like catalyst layer and an ion exchange membrane under pressure. The last thermal bonding step may be simultaneously carried out with the previous catalyst layer forming step.

2 Claims, No Drawings

PROCESS OF PREPARING ELECTRODE FOR FUEL CELL

BACKGROUND OF THE INVENTION

The present invention relates to an electrode employed in a solid polymer electrolyte type PEM (Proton Exchange Membrane) fuel cell and a direct type methanol fuel cell.

The PEM fuel cell is expected to be a compact and high output-density fuel cell. Followings are several methods for preparing this electrode of the PEM fuel cell.

(1) A method consisting of forming an electrode sheet by mixing electrocatalyst particles prepared in advance and polytetrafluoroethylene, and thermally bonding this sheet onto an ion exchange resin membrane under pressure (prior publications: U.S. Pat. Nos. 3,134,697, 3,297,484 and 3,432,355).

(2) A method of precipitating catalyst particles near the surface of an ion exchange resin membrane by means of chemical reduction (prior publications: Japanese patent publication gazettes Nos. 55-38934 and 58-47471).

The utilization ratio of the catalyst of the above methods are low, and a platinum catalyst amount of up to 20 mg/cm$^2$ is required so that an inexpensive electrode for a fuel cell cannot be realized.

Followings are indispensable factors of effective catalyst working.

(i) Catalyst possesses sufficient electric contact with a membrane.

(ii) The catalyst exists in the ion exchange membrane as finely as possible, in other words it exists in high dispersion and the electric contact among the particles is maintained.

(iii) The membrane covering the surface of the catalyst possesses a sufficient thickness for keeping considerable ionic conductivity while it should not be too thick to prevent diffusion of a reaction gas to the catalyst.

However, the above conventional method (1) does not satisfy (i), and the method (2) does not satisfy (ii).

Recently, as improvement of the method (i), a certain degree of elevation of catalyst utilization has been intended by secondarily applying catalyst on a molded electrode sheet surface by means of sputtering (prior publication: E. A. Ticionelle et. al., J. Electrochem. Soc., 135 (1988) 2209).

Since, however, the catalyst exists in a considerable thin layer in this method, the catalyst gets deeply into the ion exchange membrane resulting in the insufficient supply of the reaction gas and in the remarkable lowering of the characteristics. The incorporation of the sputtering process lowers the preparation efficiency and lacks the mass productivity.

The required factors in the above (iii) are contradictory with each other, and the improvement of properties by optimizing conditions may have limitations.

SUMMARY OF THE INVENTION

Accordingly, an object of the present invention is to overcome all disadvantages of the conventional process of preparing electrodes;

Another object is to provide a process of preparing an electrode for a fuel cell which enables perfect contact between a catalyst and an ion exchange membrane and among catalyst particles for utilizing the catalyst highly dispersed in the ion exchange membrane;

A further object us to provide a process of preparing an electrode for a fuel cell which enables easier preparation and elevation of characteristics.

A process of preparing an electrode for a fuel cell for overcoming the above problems according to the present invention is characterized in that the process comprises impregnating catalyst particles with a solution of ion exchange resin to form, after drying, a thin layer of the ion exchange resin on the surface thereof, impregnating non-catalyst particles separately prepared with a solution of ion exchange resin to form, after drying, a thick layer of the ion exchange resin on the surface thereof, mixing the two kinds of particles coated with the ion exchange resin with a hydrophobic binder, forming a sheet-like catalyst layer by means of hot pressing or cold pressing and, simultaneously with this formation or after the formation, thermally bonding this sheet-like catalyst layer and an ion exchange membrane under pressure.

Since, according to the process of preparing the electrode for the cell of this invention, the catalyst and the ion exchange resin film can be in perfect contact with each other, the ionic conductivity on the surface of the non-catalyst particles can be sufficiently secured, the perfect contact among the catalyst particles can be attained and further the electric contact between the ion exchange resin thin layer of the surface of the catalyst particles and the ion exchange resin membrane can be easily secured, the electrode having the high performance and the low cost with the lesser amount of the catalyst can be easily prepared. The present invention may largely contribute to the realization of the preparation of a compact and high power-density fuel cell.

DETAILED DESCRIPTION OF THE INVENTION

Since, in the process of preparing the electrode for the fuel cell according to the invention, the catalyst particles are impregnated with the solution of ion exchange resin and dried for forming the thin layer of the ion exchange resin on the surface thereof, the catalyst and the ion exchange resin film are in perfect contact with each other. Since the non-catalyst particles separately prepared are impregnated with the solution of ion exchange resin and dried for forming the thick layer of the ion exchange resin on the surface thereof, the surface of the non-catalyst particles can secure sufficient ionic conductivity. Since, further, the two kinds of particles coated with the ion exchange resin after mixed with a hydrophobic binder is hot-pressed or cold-pressed to form a sheet-like catalyst layer, the catalyst particles are in perfect contact with each other. Since simultaneously with this pressing or after the pressing, this sheet-like catalyst layer and the ion exchange membrane is thermally bonded under pressure, the electric contact between the thin layer on the surface of the catalyst particles and the ion exchange membrane is secured.

In this manner, the electrode having the high performance and the low cost can be realized with a lesser amount of catalyst without employing the sputtering and a delicate process for effectively making the use of the sputtering.

The substrate of the catalyst particles may include carbon-like substances such as carbon black and active carbon, inorganic substances such as boron carbide and titanium carbide. The primary particle size may be range from about 0.01 μm to about 1.0 μm.

The ion exchange resin may be preferably fluorinated or perfluorinated hydrocarbon resin having at least one functional group such as a carboxylic group and a sulfonic group. Any other conductive resin having the ion exchange ability may be employed. The ion exchange resin may be dissolved into such a solvent as an organic solvent including an alcohol and an ether.

The substrate of the non-catalyst particles may be the same as or different from that of the catalyst particles, and may include carbonlike substances such as carbon black and active carbon, inorganic substances such as boron carbide and titanium carbide. The primary particle size may be range from about 0.01 μm to about 1.0 μm. An agglomerate particle size may be range from about 0.1 μm to 10 μm.

The ion exchange film thickness on the catalyst particles is thinner than that of the non-catalyst particles, and may range from about 0.003 rμm to 0.15 rμm (hereinafter "r" indicates a primary size). The ion exchange film thickness on the non-catalyst particles may range from about 0.03 rμm to 0.5 rμm. The thickness of the ion exchange film thickness may be adjusted by the concentration of the solution of the ion exchange resin or the repetition of the impregnation procedures. The hydrophobic binder may be such hydrophobic material as polytetrafluoroethylene (PTFE), tetrafluoroethylene-hexafluoropropylene copolymer (FEP) and polyethylene which gives the hydrophobicity, elasticity and porosity to the final electrode.

The cold-pressing may be carried out at the room temperature under the pressure from 1 atm to 200 atm, preferably from 5 atm to 50 atm, for from 5 seconds to 300 seconds.

The hot-pressing may be carried out at the temperature from about 80° C. to 170° C. under the pressure from 1 atm to 100 atm for from 1 second to 300 seconds.

The thermal bonding may be carried out at the same conditions as those of the hot-pressing.

The above conditions are decided in a range that the particles with the ion exchange film may make sufficient contacts and the film may not degrade with heat.

EXAMPLES

One Example of the process of preparing the electrode of the fuel cell according to the present invention will be described.

After 0.5 g of carbon black supporting 30% in weight of metal was impregnated with a butanol solution of 0.1% in weight of Nafion ion exchange resin, it was dried in vacuum in at 50° C. to prepared catalyst particles to a surface of which about 4% in weight of the Nafion ion exchange resin was applied. Then, after 0.5 g of carbon black supporting no catalyst separately prepared was impregnated with a butanol solution of 0.1% in weight of Nafion ion exchange resin, it was dried in vacuum at 50° C. to prepare non-catalyst particles to a surface of which about 10% in weight of the Nafion ion exchange resin was applied. Then, after the mixture of these two kinds of the particles (1:1) was mixed with PTFE dispersion, it was filtered and dried. After the mixture particles thus obtained was scattered on carbon sheet (already hydrophobically treated with 20% in weight of PTFE) usually employed as a fuel cell electrode substrate at the platinum weight of 0.5 mg/cm$^2$, it was pressed at the pressure of 40 kg/cm$^2$ at 130° C. for 5 seconds to be molded into an electrode. A commercially available ion exchange resin membrane Nafion 117 was inserted between the two sheets of the above electrodes and was pressed at the pressure of 40 kg/cm$^2$ at 160° C. for 5 seconds to be molded into an electrode for a fuel cell.

It was incorporated into a battery holder not shown and a characteristic test for the hydrogen-oxygen fuel cell was carried out. The performance obtained thereby is shown in the below Table I.

TABLE I

| BATTERY PERFORMANCE (60° C., IR free performance) | | | | |
|---|---|---|---|---|
| Voltage (mV) | 850 | 800 | 700 | 600 |
| Current (mA/cm$^2$) | 17 | 52 | 320 | 600 |

Catalyst Amount: 0.5 mg-Pt/cm$^2$ both on anode and cathode
Hydrogen Gas Humidification Temperature: 90° C.
Reaction Gas: H$_2$/O$_2$ = 1/1 (1atm)

As apparent from the foregoing, such large current density as large as 600 mA/cm$^2$ at 0.6 V was obtained with only 1 mg/cm$^2$ of the platinum catalyst amount on the both electrodes being usually accepted in a phosphoric acid type fuel cell. This performance may be equal to that of a fuel cell employing an electrode treated with such a complex treatment as sputtering.

What is claimed is:

1. A process for preparing an electrode for a fuel cell which comprises impregnating catalyst particles with a solution of ion exchange resin to form, after drying, a thin layer of the ion exchange resin on the surface thereof, impregnating non-catalyst particles separately prepared with a solution of ion exchange resin to form, after drying, a thicker layer of the ion exchange resin on the surface thereof than that on the catalyst particle surface, mixing the two kinds of particles coated with the ion exchange resin layer with a hydrophobic binder, forming a sheet-like catalyst layer by means of hot pressing and, simultaneously with this formation, thermally bonding this sheet-like catalyst layer and an ion exchange membrane under pressure.

2. A process for preparing an electrode for a fuel cell which comprises impregnating catalyst particles with a solution of ion exchange resin to form, after drying, a thin layer of the ion exchange resin on the surface thereof, impregnating non-catalyst particles separately prepared with a solution of ion exchange resin to form, after drying, a thicker layer of the ion exchange resin on the surface thereof than that on the catalyst particle surface, mixing the two kinds of particles coated with the ion exchange resin layer with a hydrophobic binder, forming a sheet-like catalyst layer by means of hot pressing or cold pressing and thermally bonding this sheet-like catalyst layer and an ion exchange membrane under pressure.

* * * * *